United States Patent
Du et al.

(10) Patent No.: US 10,585,791 B2
(45) Date of Patent: Mar. 10, 2020

(54) ORDERING OF MEMORY DEVICE MAPPING TO REDUCE CONTENTION

(71) Applicant: Intel Corporation, Santa Clara, CA (US)

(72) Inventors: Yu Du, Santa Clara, CA (US); Ryan Norton, Placerville, CA (US); David J. Pelster, Longmont, CO (US); Xin Guo, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 38 days.

(21) Appl. No.: 15/925,907

(22) Filed: Mar. 20, 2018

(65) Prior Publication Data
US 2019/0042403 A1 Feb. 7, 2019

(51) Int. Cl.
*G06F 12/02* (2006.01)
*G06F 7/58* (2006.01)
*G06F 12/06* (2006.01)

(52) U.S. Cl.
CPC ............ *G06F 12/0223* (2013.01); *G06F 7/58* (2013.01); *G06F 12/0246* (2013.01); *G06F 12/0607* (2013.01); *G06F 12/0292* (2013.01); *G06F 2212/1008* (2013.01); *G06F 2212/1024* (2013.01); *G06F 2212/7208* (2013.01)

(58) Field of Classification Search
CPC ...... G06F 3/0617; G06F 3/064; G06F 3/0659; G06F 3/0683; G06F 3/0688; G06F 7/58; G06F 12/0223; G06F 12/0623; G06F 2212/1008
USPC ............................ 711/5, 148, 154, 167, 170
See application file for complete search history.

(56) References Cited

U.S. PATENT DOCUMENTS

| | | | |
|---|---|---|---|
| 10,067,719 B1* | 9/2018 | Newman | G06F 3/0659 |
| 2010/0131724 A1* | 5/2010 | Miura | G06F 13/4243 |
| | | | 711/154 |
| 2013/0198477 A1* | 8/2013 | Wilkinson | G06F 11/2064 |
| | | | 711/167 |
| 2014/0082261 A1* | 3/2014 | Cohen | G11C 16/06 |
| | | | 711/103 |
| 2016/0283157 A1* | 9/2016 | Kanai | G06F 3/0679 |

OTHER PUBLICATIONS

Drew Riley, "Intel SSD DC S3700 Review: Benchmarking Consistency", Tom's Hardware, Jan. 30, 2013, 5 pages.

* cited by examiner

*Primary Examiner* — Gary J Portka
(74) *Attorney, Agent, or Firm* — Jordan IP Law, LLC

(57) ABSTRACT

An embodiment of a semiconductor apparatus may include technology to determine a differentiator associated with an access request for two or more memory devices, and set a target order for the two or more memory devices based on the differentiator. Other embodiments are disclosed and claimed.

19 Claims, 5 Drawing Sheets

ORDERING OF MEMORY DEVICE MAPPING TO REDUCE CONTENTION

TECHNICAL FIELD

Embodiments generally relate to memory systems. More particularly, embodiments relate to an ordering of memory device mapping to reduce contention.

BACKGROUND

A memory component may include multiple memory devices on the same substrate. For example, a semiconductor package may include multiple memory die. Similarly, a dual-inline memory module (DIMM) may include multiple memory devices on one or both sides of a printed circuit board (PCB). A solid-state drive (SSD) may include multiple nonvolatile memory (NVM) devices.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with nonvolatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
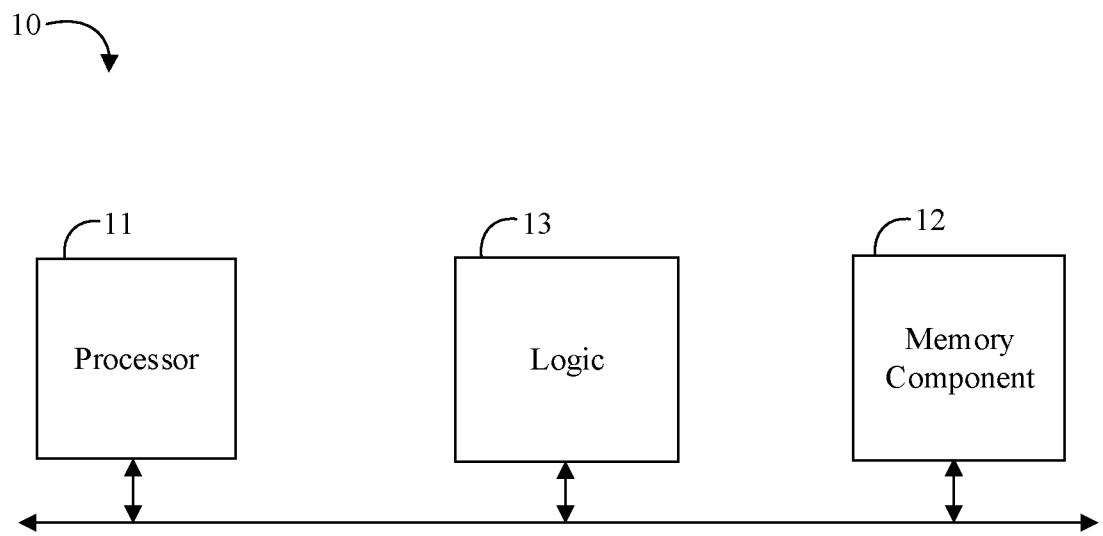
FIG. 1 is a block diagram of an example of an electronic processing system according to an embodiment.

Turning now to FIG. 1, an embodiment of an electronic processing system 10 may include a processor 11, a memory component 12 communicatively coupled to the processor, the memory component 12 including two or more memory devices, and logic 13 communicatively coupled to the processor 11 and the memory component 12 to determine a differentiator associated with an access request for the two or more memory devices, and set a target order for the two or more memory devices based on the differentiator. In some embodiments, the logic 13 may be configured to set the target order for the two or more memory devices to a random order based on the differentiator. For example, the logic 13 may be configured to generate random numbers using the differentiator as a seed, and set the target order for the two or more memory devices to the random order based on the generated random numbers. In some embodiments, the logic 13 may also be configured to set a position in the target order for one or more of the two or more memory devices to a pre-determined position in the target order for all access requests (e.g., to exclude memory devices assigned to parity from any re-ordering). For example, the differentiator may correspond to one or more of a band number, an erase block number, and a stream identifier. In some embodiments, the logic 13 may be configured to set the target order for the two or more memory devices based on an entry in a table corresponding to the differentiator (e.g., using the differentiator as an index to a lookup table). For example, the memory component may include a SSD and the two or more memory devices may include NAND die of the SSD. In some embodiments, the logic 13 may be located in, or co-located with, various components, including the processor 11 and/or the memory component 12 (e.g., on a same substrate or die).

Embodiments of each of the above processor 11, memory component 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory component 12, persistent storage media, or other system memory may store a set of instructions which when executed by the processor 11 cause the system 10 to implement one or more components, features, or aspects of the system 10 (e.g., the logic 13, determining the differentiator associated with the access request for the two or more memory devices, setting the target order for the two or more memory devices based on the differentiator, etc.).

Figure 2:
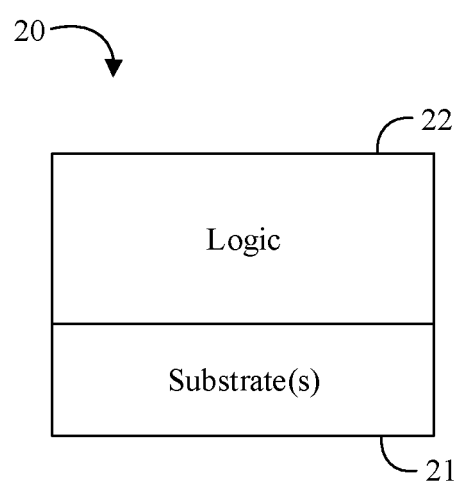
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine a differentiator associated with an access request for two or more memory devices, and set a target order for the two or more memory devices based on the differentiator. In some embodiments, the logic 22 may be configured to set the target order for the two or more memory devices to a random order based on the differentiator. For example, the logic 22 may be configured to generate random numbers using the differentiator as a seed, and set the target order for the two or more memory devices to the random order based on the generated random numbers. In some embodiments, the logic 22 may also be configured to set a position in the target order for one or more of the two or more memory devices to a pre-determined position in the target order for all access requests (e.g., to exclude memory devices assigned to parity from any re-ordering). For example, the differentiator may correspond to one or more of a band number, an erase block number, and a stream identifier. In some embodiments, the logic 22 may be configured to set the target order for the two or more memory devices based on an entry in a table corresponding to the differentiator (e.g., using the differentiator as an index to a lookup table). For example, the memory component may include a SSD and the two or more memory devices may include NAND die of the SSD. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
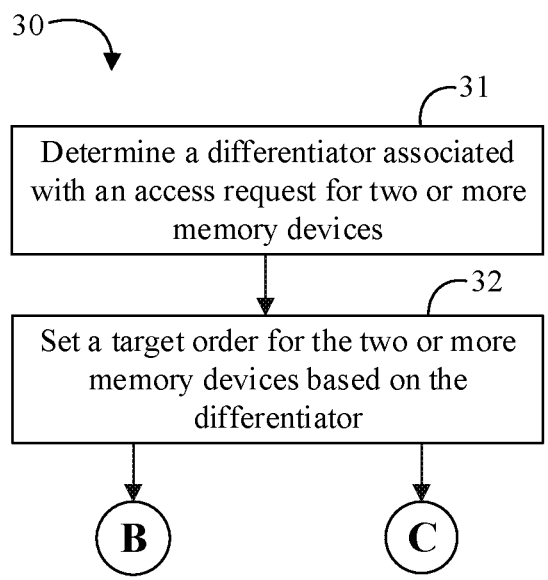
FIGS. 3A to 3C are flowcharts of an example of a method of ordering memory devices according to an embodiment.
Figure 3B:
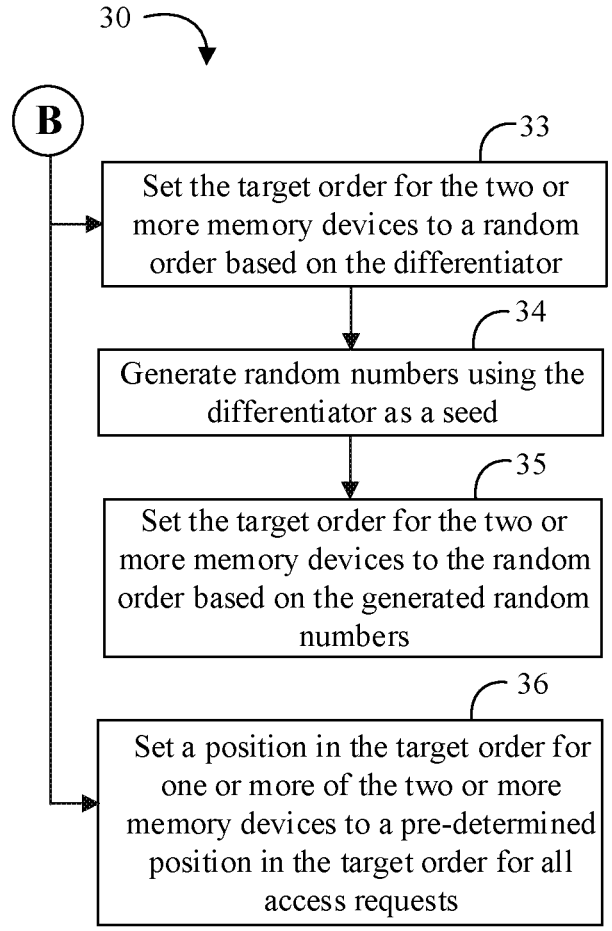
Figure 3C:
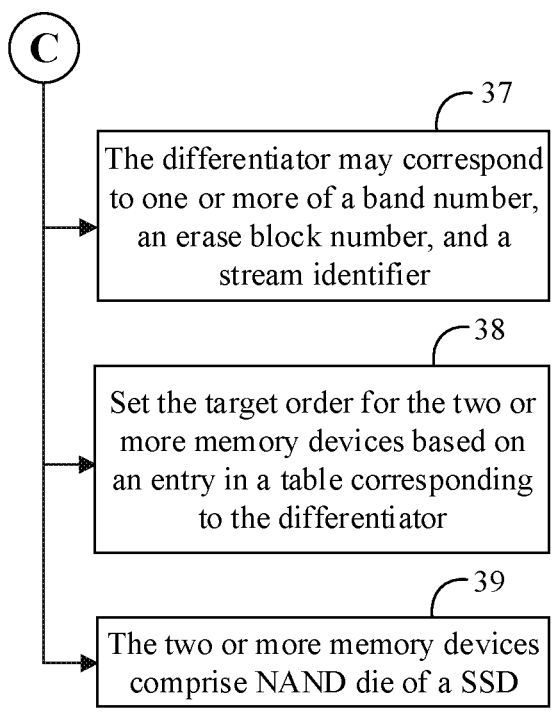

Turning now to FIGS. 3A to 3C, an embodiment of a method 30 of ordering memory devices may include determining a differentiator associated with an access request for two or more memory devices at block 31, and setting a target order for the two or more memory devices based on the differentiator at block 32. Some embodiments of the method 30 may further include setting the target order for the two or more memory devices to a random order based on the differentiator at block 33. For example, the method 30 may include generating random numbers using the differentiator as a seed at block 34, and setting the target order for the two or more memory devices to the random order based on the generated random numbers at block 35. Some embodiments of the method 30 may further include setting a position in the target order for one or more of the two or more memory devices to a pre-determined position in the target order for all access requests at block 36. For example, the differentiator may correspond to one or more of a band number, an erase block number, and a stream identifier at block 37. Some embodiments of the method 30 may further include setting the target order for the two or more memory devices based on an entry in a table corresponding to the differentiator at block 38. For example, the two or more memory devices comprise NAND die of a SSD at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 23 to 29 below. Embodiments or portions of the method 30 may be implemented in firmware, applications (e.g., through an application programming interface (API)), or driver software running on an operating system (OS).

Figure 4:
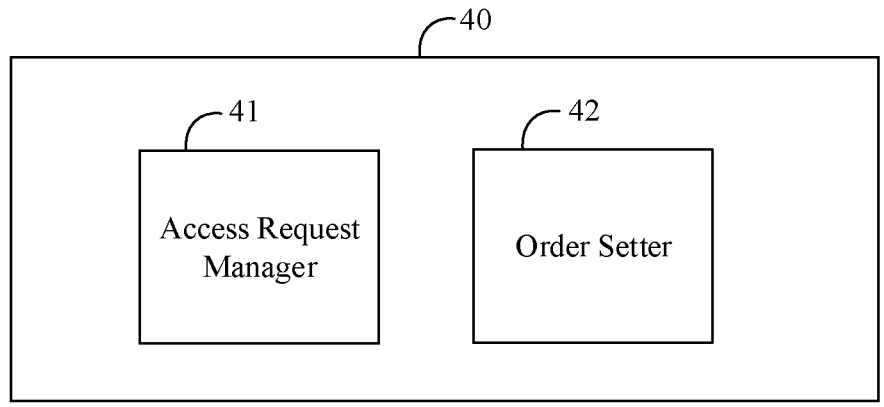
FIG. 4 is a block diagram of an example of a storage controller apparatus according to an embodiment.

Turning now to FIG. 4, some embodiments may be physically or logically arranged as one or more modules. For example, an embodiment of a storage controller 40 may include an access request manager 41 and an order setter 42. The access request manager 41 may receive a request for access (e.g., a read request, a write request, etc.) to a SSD, where the SSD includes a plurality of NAND die. The access request manager may determine a differentiator associated with the access request (e.g., which may target the plurality of NAND die). For example, the differentiator may correspond to a band number, an erase block number, a stream identifier, or any other persistent information associated with the access request which differentiates between access requests. The order setter 42 may include technology (e.g., logic, a finite state machine, etc.) to set a target order for the NAND die based on the differentiator. In some embodiments, the order setter 42 may be configured to set the target order for the NAND die to a random order based on the differentiator. For example, the order setter 42 may be configured to generate random numbers using the differentiator as a seed, and set the target order for the NAND die to the random order based on the generated random numbers. In some embodiments, the order setter 42 may also be configured to set a position in the target order for one or more of the NAND die to a pre-determined position in the target order for all access requests (e.g., to exclude NAND die assigned to parity from any re-ordering). In some embodiments, the order setter 42 may be configured to set the target order for the NAND die based on an entry in a table corresponding to the differentiator (e.g., using the differentiator as an index to a lookup table).

Embodiments of the access request manager 41, the order setter 42, and other components of the storage controller 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide channel media mapping randomization for quality-of-service (QoS) latency improvement or optimization on SSDs. Some SSDs may rely on concurrency to achieve high performance in write workloads. By utilizing a fast cache to buffer and then distributing writes across multiple NAND die in parallel, the slower NAND write speed may be hidden from the host in many scenarios. SSDs may also manage different data priorities. For example, servicing host writes quickly may be important to maintaining host QoS. Background meta data writes may be more forgiving of delays, as long as an appropriate minimum level of progress is being made.

Because the NAND die may be shared between host and background data and only one write may be processed at a time, there may be resource contention between the various priority writes. If host writes consistently lose this contention and are delayed behind lower priority background writes, they may remain resident in the cache longer. Once the cache is full and can no longer accept host data, the drive cannot accept further host writes, which may have a direct negative impact on QoS. For example, QoS may include a metric that combines throughput, latency, and performance consistency.

Without being limited to theory of operation, a consistent contention may be caused by the nature of how work is dispatched (e.g., writes may be atomically dispatched to a small number of NAND die at once, host and background data may target different erase blocks). If background writes occur at a close frequency to host writes and happen to be targeting the same die just before the host write, the background writes may get dispatched first and force the host writes to wait until the die has completed the initial write. Some embodiments may advantageously reduce the residency of host writes in the cache due to delays caused by dispatching background writes to the same NAND die just prior to dispatching the host writes. For example, some embodiments may change the order of targeting dies between host and background data to stop consistent collisions between the two. By reducing residency of host writes in the cache, some embodiments may advantageously free resources to allow the drive to accept new host traffic sooner. Host requests that may have otherwise been blocked by the drive as it waits on cache resources may be processed with less delay, which in turn may reduce latency to the host. Accordingly, some embodiments may provide improved QoS in some write-only and mixed workloads.

While some die contention may remain, some embodiments may reduce or eliminate consistent collisions in which the host writes "lose" by being queued after background writes. While background meta data writes and host writes target different bands (e.g., a consistent set of erase blocks grouped together across all dice), in some other systems both the background writes and the host writes may follow the same die targeting order. For example, the write ordering may be selected to ensure a deterministic pattern that can be followed to determine the layout of data written across the dice (e.g., which may be important for reading back data and resuming writes after powering on). Each source of writes may be treated as a separate stream of data (e.g., a write stream), and the drive may track the next writable location (e.g., die, block, and page) within the band associated with the stream. As long as the two write streams target different die sufficiently far apart in the die targeting pattern, there may be no die contention. However, if the two streams have different velocities, one stream may eventually overtake the other stream and may cause die contention. If the velocity delta is small and the die input/output (IO) and programming time is large, such die contention may last for many consecutive dice.

Some other systems may forcibly halt background activity when the background activity threatens to bypass the host, but this suffers from several problems. First, such a halt may require the background write stream to have detailed knowledge of other streams, increasing coupling within the system. Restricting background activity to the rate of the host may also block the background from making minimum necessary progress to maintain the health of the system. Offsetting the starting die for the streams may be insufficient to reduce or avoid die contention, because the background write stream may be guaranteed to have a faster write (e.g., depending on workload and an amount of spare blocks available to the drive). For example, the purpose of some background streams may be to free up previously written blocks via garbage collection (GC). During GC, valid data may be written to a new block, freeing up an original block for reuse. The background stream must free up an entire block of space for the host stream, and must do so at least as fast as the host writes a block of data (e.g., otherwise the drive may run out of free blocks). Each block the background stream runs GC on only frees up the invalid space on that block, requiring the background stream to GC multiple blocks before the background stream frees up a full block's worth. Running GC on blocks with more than 50% valid data will write more data than the background stream frees. This requires the background stream to write faster than the host stream to ensure that the background stream frees space at the same rate the host consumes it.

Advantageously, some embodiments may reduce or avoid consecutive die collisions by selecting different or arbitrary orders between background and host writes. For example, some embodiments may break the consecutive die collisions by randomizing the die targeting order between background and host writes. Depending on system implementation, one or more condition and/or constraints may be applied to selecting the die order. For example, a general condition is that the die order may vary between current write streams. In some embodiments, die order must be deterministic for a band starting from an initial write until the band is erased, and the ordering must be maintained across power loss events. Knowledge of and/or re-creation of the ordering may be important for interpreting journaling data, issuing reads, and restoring write ordering after powering on. In some embodiments, the ordering may account for gaps in die targets for a particular band. For example, defective erase blocks in the band may not be targeted for writing.

In some embodiments, certain die positions may be excluded from the die ordering. For example, a parity protection die may be excluded from randomized ordering (e.g., or always selected in the same position in the order). Parity die may save calculated parity bits used to recover corrupted data. Parity bits may be calculated from the data written from the first to the penultimate die, and therefore they may be written to the last die. While parity data could be written to the last randomized die in a band, this would distribute parity writes across all dice as write streams moved from band to band, which may have negative impact on host read performance.

Figure 5:
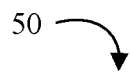
FIG. 5 is a flowchart of an example of a method of ordering NAND die according to an embodiment.
Figure 5:
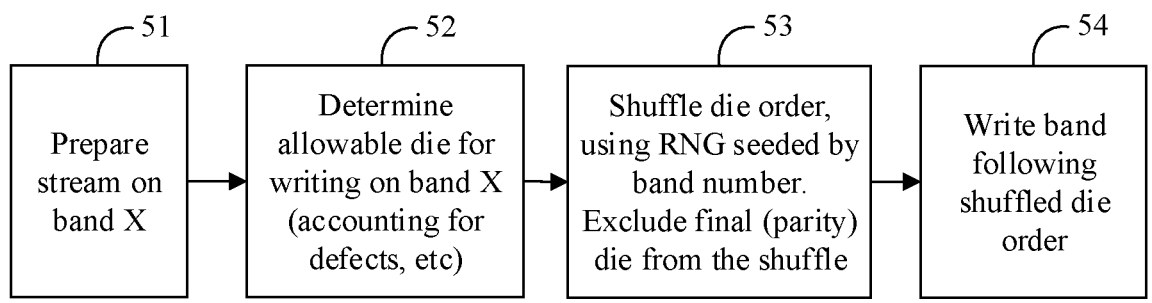

Turning now to FIG. 5, a method 50 of ordering NAND die may include preparing a stream for write access on band X at block 51, and determining allowable die for writing on band X at block 52 (e.g., accounting for defects, etc.). The method 50 may then include shuffling the die order at block 53 (e.g., using a random number generator (RNG) seeded by the band number X). At block 53, the final (e.g., parity) die may be excluded from the shuffle. The method 50 may then write the band following the shuffled die order at block 54.

Figure 6:
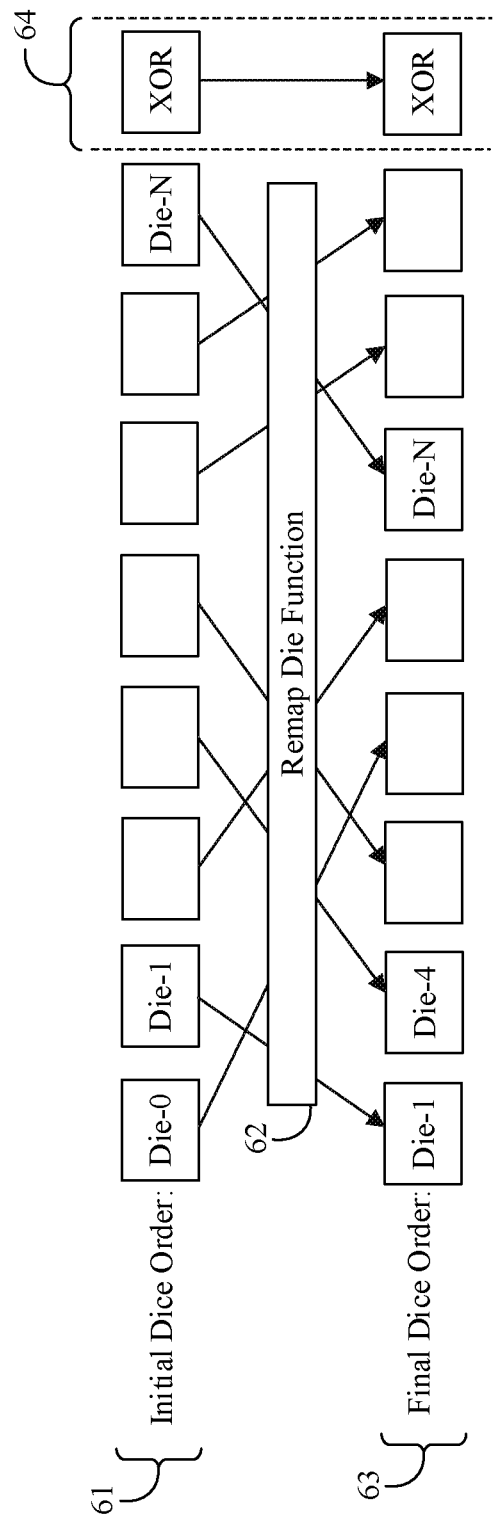
FIG. 6 is an illustrative diagram of an example of memory die reordering according to an embodiment.

Turning now to FIG. 6, an illustrative diagram of an embodiment of memory die reordering shows how an initial dice order 61 may go through a remap die function 62 to provide a final dice order 63, while a final die position 64 (e.g., for the parity die) may be excluded from the remap die function 62. For example, in some embodiments the reordering may be accomplished by taking the generated list of target dice for the band and randomly shuffling it, using the band number as the seed for an underlying RNG (e.g., excluding the final parity die 64 for the band from the shuffle). Some embodiments may meet one or more conditions and constraints noted above. For example, because each write stream operates on a different band, the band number provides a different die order to each write stream (e.g., using the band number as the seed for the RNG). The band number also provides a deterministic seed that can recreate the original randomized order if needed.

Figure 7:
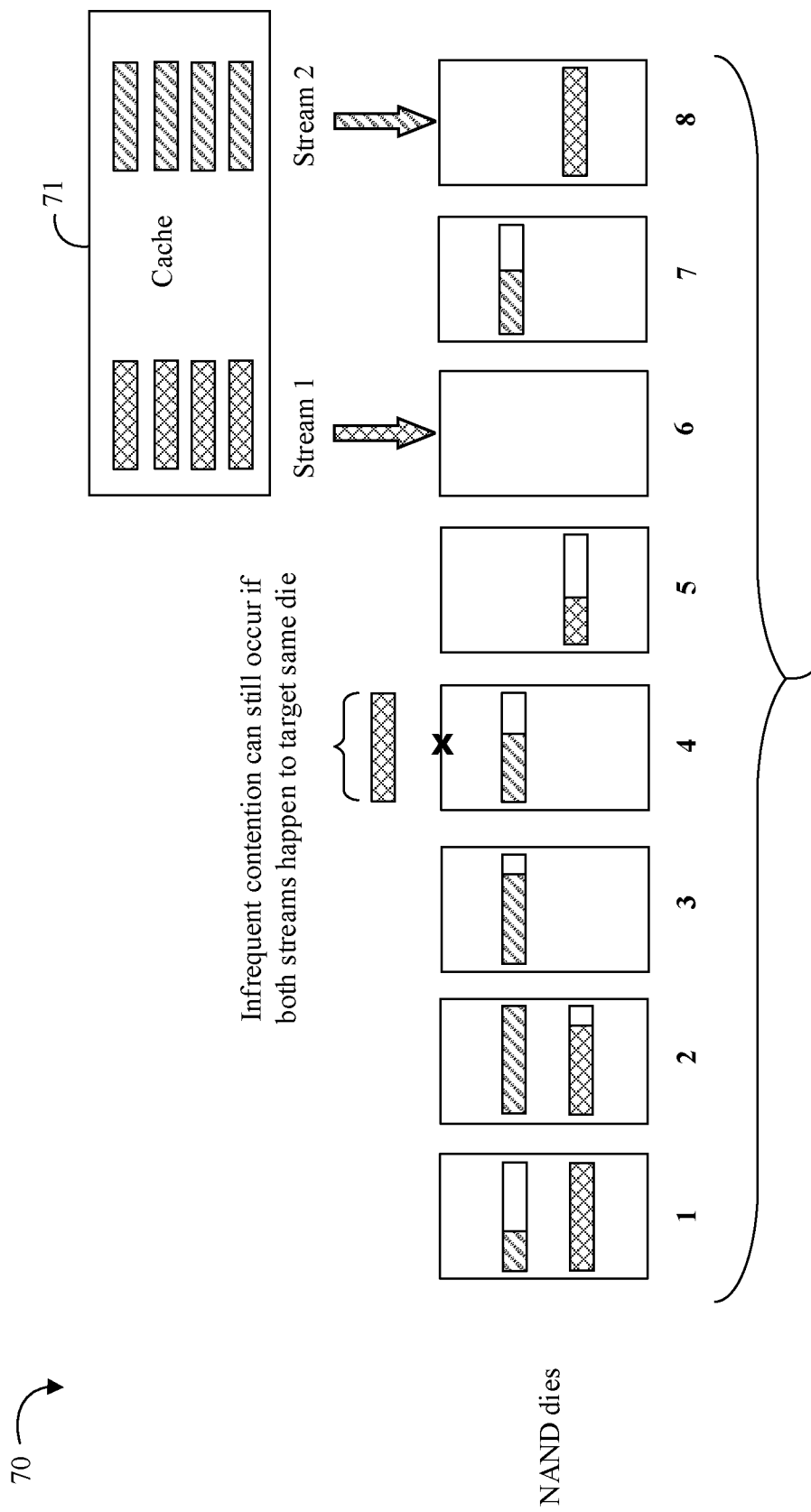
FIG. 7 is a block diagram of an example of a storage system according to an embodiment.

Turning now to FIG. 7, an embodiment of a storage system 70 may include a cache 71 and a plurality of NAND die 72 having nominal positions one (1) through eight (8) indicated below respective die. The cache 71 may support multiple access streams (e.g., Streams 1 through N, where >1) including Stream 1 and Stream 2. In some other systems, both Stream 1 and Stream 2 may target the same die order (e.g., which may result in more consistent die content as discussed above). In some embodiments, the individual write streams may advantageously follow their own unique die ordering (e.g., band-specific randomized ordering). For example, the system 70 may include technology to set the target die order for Stream 1 to be different from the target die order for Stream 2, advantageously reducing die contention. For example, the target order for Stream 1 may be 2, 4, 1, 8, and 5, while the target order for Stream 2 may be 3, 4, 7, 1, and 2. As noted at position 4 of the NAND die, some contention may still occur if both streams happen to target the same die at the same time. Such contention, however, may be significantly less than might occur if both Stream 1 and Stream 2 have the same target die order. Some embodiments may provide a significant improvement in write QoS. As workloads increase in write throughput, the workloads become more likely to saturate the cache 71. Some embodiments of die ordering/randomization may advantageously provide a reduction in latency on high QoS percentiles, with more positive impact in the workloads more likely to cause die contention.

ADDITIONAL NOTES AND EXAMPLES

Example 1 may include an electronic processing system, comprising a processor, a memory component communicatively coupled to the processor, the memory component including two or more memory devices, and logic communicatively coupled to the processor and the memory component to determine a differentiator associated with an access request for the two or more memory devices, and set a target order for the two or more memory devices based on the differentiator.

Example 2 may include the system of Example 1, wherein the logic is further to set the target order for the two or more memory devices to a random order based on the differentiator.

Example 3 may include the system of Example 2, wherein the logic is further to generate random numbers using the differentiator as a seed, and set the target order for the two or more memory devices to the random order based on the generated random numbers.

Example 4 may include the system of Example 3, wherein the logic is further to set a position in the target order for one or more of the two or more memory devices to a pre-determined position in the target order for all access requests.

Example 5 may include the system of Example 3, wherein the differentiator corresponds to one or more of a band number, an erase block number, and a stream identifier.

Example 6 may include the system of Example 1, wherein the logic is further to set the target order for the two or more memory devices based on an entry in a table corresponding to the differentiator.

Example 7 may include the system of any of Examples 1 to 6, wherein the two or more memory devices comprise NAND die of a solid state drive.

Example 8 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine a differentiator associated with an access request for two or more memory devices, and set a target order for the two or more memory devices based on the differentiator.

Example 9 may include the apparatus of Example 8, wherein the logic is further to set the target order for the two or more memory devices to a random order based on the differentiator.

Example 10 may include the apparatus of Example 9, wherein the logic is further to generate random numbers using the differentiator as a seed, and set the target order for the two or more memory devices to the random order based on the generated random numbers.

Example 11 may include the apparatus of Example 10, wherein the logic is further to set a position in the target order for one or more of the two or more memory devices to a pre-determined position in the target order for all access requests.

Example 12 may include the apparatus of Example 10, wherein the differentiator corresponds to one or more of a band number, an erase block number, and a stream identifier.

Example 13 may include the apparatus of Example 8, wherein the logic is further to set the target order for the two or more memory devices based on an entry in a table corresponding to the differentiator.

Example 14 may include the apparatus of any of Examples 8 to 13, wherein the two or more memory devices comprise NAND die of a solid state drive.

Example 15 may include the apparatus of any of Examples 8 to 13, wherein the logic coupled to the one or more substrates includes transistor channel regions that are positioned within the one or more substrates.

Example 16 may include a method of ordering memory devices, comprising determining a differentiator associated with an access request for two or more memory devices, and setting a target order for the two or more memory devices based on the differentiator.

Example 17 may include the method of Example 16, further comprising setting the target order for the two or more memory devices to a random order based on the differentiator.

Example 18 may include the method of Example 17, further comprising generating random numbers using the differentiator as a seed, and setting the target order for the two or more memory devices to the random order based on the generated random numbers.

Example 19 may include the method of Example 18, further comprising setting a position in the target order for one or more of the two or more memory devices to a pre-determined position in the target order for all access requests.

Example 20 may include the method of Example 18, wherein the differentiator corresponds to one or more of a band number, an erase block number, and a stream identifier.

Example 21 may include the method of Example 16, further comprising setting the target order for the two or more memory devices based on an entry in a table corresponding to the differentiator.

Example 22 may include the method of any of Examples 16 to 21, wherein the two or more memory devices comprise NAND die of a solid state drive.

Example 23 may include at least one computer readable medium, comprising a set of instructions, which when executed by a computing device, cause the computing device to determine a differentiator associated with an access request for two or more memory devices, and set a target order for the two or more memory devices based on the differentiator.

Example 24 may include the at least one computer readable medium of Example 23, comprising a further set of instructions, which when executed by the computing device, cause the computing device to set the target order for the two or more memory devices to a random order based on the differentiator.

Example 25 may include the at least one computer readable medium of Example 24, comprising a further set of instructions, which when executed by the computing device, cause the computing device to generate random numbers using the differentiator as a seed, and set the target order for the two or more memory devices to the random order based on the generated random numbers.

Example 26 may include the at least one computer readable medium of Example 25, comprising a further set of instructions, which when executed by the computing device, cause the computing device to set a position in the target order for one or more of the two or more memory devices to a pre-determined position in the target order for all access requests.

Example 27 may include the at least one computer readable medium of Example 25, wherein the differentiator corresponds to one or more of a band number, an erase block number, and a stream identifier.

Example 28 may include the at least one computer readable medium of Example 23, comprising a further set of instructions, which when executed by the computing device, cause the computing device to set the target order for the two or more memory devices based on an entry in a table corresponding to the differentiator.

Example 29 may include the at least one computer readable medium of any of Examples 23 to 28, wherein the two or more memory devices comprise NAND die of a solid state drive.

Example 30 may include a storage controller apparatus, comprising means for determining a differentiator associated with an access request for two or more memory devices, and means for setting a target order for the two or more memory devices based on the differentiator.

Example 31 may include the apparatus of Example 30, further comprising means for setting the target order for the two or more memory devices to a random order based on the differentiator.

Example 32 may include the apparatus of Example 31, further comprising means for generating random numbers using the differentiator as a seed, and means for setting the target order for the two or more memory devices to the random order based on the generated random numbers.

Example 33 may include the apparatus of Example 32, further comprising means for setting a position in the target order for one or more of the two or more memory devices to a pre-determined position in the target order for all access requests.

Example 34 may include the apparatus of Example 32, wherein the differentiator corresponds to one or more of a band number, an erase block number, and a stream identifier.

Example 35 may include the apparatus of Example 30, further comprising means for setting the target order for the two or more memory devices based on an entry in a table corresponding to the differentiator.

Example 36 may include the apparatus of any of Examples 30 to 35, wherein the two or more memory devices comprise NAND die of a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   a memory component communicatively coupled to the processor, the memory component including two or more memory devices; and
   logic communicatively coupled to the processor and the memory component to:
      identify a differentiator associated with an access request for the two or more memory devices,
      set a target order for the two or more memory devices based on the differentiator, and
      set a position in the target order for one or more of the two or more memory devices to a pre-determined position in the target order for all access requests to maintain the one or more of the two or more memory devices in the pre-determined position.

2. The system of claim 1, wherein the logic is further to:
   set the target order for the two or more memory devices to a random order based on the differentiator.

3. The system of claim 2, wherein the logic is further to:
   generate random numbers using the differentiator as a seed; and
   set the target order for the two or more memory devices to the random order based on the generated random numbers.

4. The system of claim 3, wherein the differentiator corresponds to one or more of a band number, an erase block number, or a stream identifier.

5. The system of claim 1, wherein the logic is further to:
   set the target order for the two or more memory devices based on an entry in a table corresponding to the differentiator.

6. The system of claim 1, wherein the two or more memory devices comprise NAND die of a solid state drive.

7. A semiconductor apparatus, comprising:
   one or more substrates; and
   logic coupled to the one or more substrates, wherein the logic is at least partly implemented in one or more of configurable logic and fixed-functionality logic hardware, the logic coupled to the one or more substrates to:
      identify a differentiator associated with an access request for two or more memory devices,
      set a target order for the two or more memory devices based on the differentiator, and
      set a position in the target order for one or more of the two or more memory devices to a pre-determined position in the target order for all access requests to maintain the one or more of the two or more memory devices in the pre-determined position.

8. The apparatus of claim 7, wherein the logic is further to:
set the target order for the two or more memory devices to a random order based on the differentiator.

9. The apparatus of claim 8, wherein the logic is further to:
generate random numbers using the differentiator as a seed; and
set the target order for the two or more memory devices to the random order based on the generated random numbers.

10. The apparatus of claim 9, wherein the differentiator corresponds to one or more of a band number, an erase block number, or a stream identifier.

11. The apparatus of claim 7, wherein the logic is further to:
set the target order for the two or more memory devices based on an entry in a table corresponding to the differentiator.

12. The apparatus of claim 7, wherein the two or more memory devices comprise NAND die of a solid state drive.

13. The apparatus of claim 7, wherein the logic coupled to the one or more substrates includes transistor channel regions that are positioned within the one or more substrates.

14. A method comprising:
identifying a differentiator associated with an access request for two or more memory devices;
setting a target order for the two or more memory devices based on the differentiator; and
setting a position in the target order for one or more of the two or more memory devices to a pre-determined position in the target order for all access requests to maintain the one or more of the two or more memory devices in the pre-determined position.

15. The method of claim 14, further comprising:
setting the target order for the two or more memory devices to a random order based on the differentiator.

16. The method of claim 15, further comprising:
generating random numbers using the differentiator as a seed; and
setting the target order for the two or more memory devices to the random order based on the generated random numbers.

17. The method of claim 16, wherein the differentiator corresponds to one or more of a band number, an erase block number, or a stream identifier.

18. The method of claim 14, further comprising:
setting the target order for the two or more memory devices based on an entry in a table corresponding to the differentiator.

19. The method of claim 14, wherein the two or more memory devices comprise NAND die of a solid state drive.

* * * * *